United States Patent [19]

Elbert et al.

[11] 3,831,258

[45] Aug. 27, 1974

[54] REINFORCED POROUS METAL STRUCTURE AND MANUFACTURE THEREOF

[75] Inventors: Raymond J. Elbert, Middleburg Heights; Ernest G. Farrier, Parma, both of Ohio

[73] Assignee: Union Carbide Corporation, New York, N.Y.

[22] Filed: Dec. 20, 1971

[21] Appl. No.: 209,820

[52] U.S. Cl........ 29/420, 29/149.5 PM, 29/149.5 S, 29/163.5 R, 29/182.3, 29/527.4, 117/22
[51] Int. Cl............................................. B22f 7/04
[58] Field of Search............. 29/149.5 S, 149.5 PM, 29/163.5 R, 420, 527.2, DIG. 31, 182.3, 527.4; 117/22

[56] References Cited
UNITED STATES PATENTS

| 1,369,353 | 2/1921 | Rabe | 29/163.5 R |
| 1,964,671 | 6/1934 | Nesbitt | 29/149.5 PM |
| 2,267,918 | 12/1941 | Hildabolt | 29/149.5 PM |
| 2,457,051 | 12/1948 | LeClair | 29/149.5 PM |
| 2,498,873 | 2/1950 | Blue | 29/149.5 PM |

*Primary Examiner*—Charles W. Lanham
*Assistant Examiner*—D. C. Reiley, III
*Attorney, Agent, or Firm*—J. Hart Evans

[57] ABSTRACT

A reinforced porous metal structure, and manufacture thereof, comprising a porous metal material secured to a backing sheet having on at least a portion of its surface projected segments formed from the surface and being imbedded in the porous metal material. The reinforced porous metal structure substantially reduces spalling, tearing, and the delamination of the porous metal material when it is used in such applications as abradable seals, bearings and bearing retainers, and brake liners.

10 Claims, 11 Drawing Figures

PATENTED AUG 27 1974　　　　　　　　　　　　　　　3,831,258

REINFORCED POROUS METAL STRUCTURE AND MANUFACTURE THEREOF

FIELD OF INVENTION

This invention relates to a sheet reinforced porous metal structure wherein the sheet contains projected segments formed from its surface and imbedded in the porous metal material.

DESCRIPTION OF PRIOR ART

There are many methods presently being utilized for forming porous bodies using powdered metallurgic techniques. Generally, powder metallurgical processes involved the steps of shaping metal powder into green compacts by such techniques as loose packing, compaction, extrusion, rolling or the like, and then consolidating the green composite so formed by the nechanism of sintering. Many of these processes are described in "Treatise on Powder Metallurgy" by C. G. Goetzel, Interscience Publishers, Inc., New York, N.Y. (1949), and "Fundamental Principles of Powder Metallurgy" by W. D. Jones, Edward Arnold Publishers, London, England (1960). Further methods for fabricating porous metal sheets and the like are disclosed in U.S. Pat. No. 3,433,632; titled "Process for Producing Porous Metal Bodies;" in copending U.S. application Ser. No. 798,142 by R. J. Elbert filed Feb. 10, 1969; in copending U.S. application Ser. No. 164,516 by R. J. Elbert filed July 21, 1971; and in copending U.S. application Ser. No. 128,182 by R. J. Elbert, et al., filed March 25, 1971.

Porous metal structures, such as porous sheets, are admirably suited for use in such applications as filters, abradable seals, sound suppressors, brake shoe liners, bearings and bearing retainers, energy absorbing materials and the like. One disadvantage of porous structures, however, is that the porous metal material has a tendency to gall and/or tear off in large segment pieces when contacted by a moving member, such as encountered when porous metal materials are used as abradable seals. In addition, when porous metal structures are subjected to environments wherein thermal cycling occurs, the porous metal material has a tendency to separate or delaminate from its back-up sheet or substrate. A present approach to overcome the above limitations of porous metal materials is to imbed honeycomb type structures into the porous materials so as to supply internal strength to the porous material. These honeycomb type structures are welded or brazed to a backing sheet first before the porous metal material is deposited onto and into the honeycomb structure. In addition to entailing an expensive fabricating operation, the rigidity of the honeycomb structure is detrimental for use in abradable seal applications since the honeycomb structure resists deformation and thereby when the abrading element makes contact with the honeycomb structure, the resistance force encountered in some cases causes the honeycomb structure to separate from its backing sheet or causes excessive wear on the abrading member.

One of the primary objectives of this invention is to provide a sheet reinforced porous metal structure that is easy to fabricate and admirably suited for such applications as abradable seals, brake shoe linings, bearings and bearing retainers, and the like.

SUMMARY OF THE INVENTION

Broadly stated, this invention relates to a sheet reinforced porous metal structure and the manufacture thereof. The porous metal structure comprises a backing sheet having on at least a portion of its surface projected segments formed from its surface and containing a porous metal material secured on and to said sheet and said projected segments. The porous metal material is deposited onto and secured to said segment projected sheet to a height sufficient to at least cover and imbed the projected segments thereby providing a reinforced porous metal structure with a substantially uniform porous metal surface. Basically, the method for fabricating a sheet reinforced porous metal structure of this invention would be to initially prepare a metal sheet with projected segments formed from its surface and then deposit at least one layer of metallic particles of a suitable metal powder onto said sheet in any conventional manner such as spraying, painting, or casting so as to cover the projected segments of the sheet. The metal powder deposited sheet can thereafter be heated to a temperature sufficient to cause sintering of the particles of the metal powder thus producing a porous metal structure secured to the sheet and imbedding the projected segments. The depositing of the particles of the metal powders on the segment projected sheet may be done in the presence of a liquid suspending vehicle, such as a wetting agent, so as to obtain a substantially uniform distribution of the metal powders on the sheet.

The segment projected backing sheet can be soldered, welded, or brazed to a back-up structure prior to or subsequent to the depositing of the particles of the metal powders onto the sheet and in some applications the back-up structure may itself be the segment projected sheet.

A liquid suspending vehicle, if used, is intended to mean any liquid wherein particles of a metal powder can be substantially uniformly disposed throughout the liquid so that when applied to a surface of a material, such as a segment projected metal sheet, the metal powder particles will be substantially uniformly deposited thereon. Liquid suspending vehicles such as water; alcohols such as methanol, isopropanol and the like; aromatic hydrocarbons such as benzene and toluene; and ketones such as acetone, are liquids admirably suited for use in the fabrication of porous metal materials. Miscible mixtures of these liquids can also be used.

A porous metal material having a nominal pore size of 100 microns or less can be fabricated by known techniques using any metal or metal alloy that is available in powdered, flaked or fibrous form and that can be sintered with substantially uniformly controlled pore sized ranging anywhere from sub-micronic to 100 microns or higher. Examples of some sinterable metal powders which can be employed include nickel, copper, cobalt, iron, tungsten, silver, stainless steel, alloys such as Hastelloy X*, Haynes 25*, Haynes 188*, DH 242**, nickel base alloys and cobalt base alloys, and the like. Typical stainless steel powders include types 304 and 316 as defined in the "Metal Handbook" 8th Edition, pages 408 to 409. Other illustrative alloy powders include (a) those having the composition (wt. percent), nickel 76 percent; chromium 15.8 percent; iron 7.2 percent; magnesium 0.2 percent; silicon 0.2 percent; carbon 0.4 percent; and copper 0.1 percent, and (b) those described in U.S. Pat. No. 2,703,277. The metal particle sizes are not critical but generally particles having an average diameter in the range of 1 to 100 microns are preferred. The choice of particle sizes depends primarily on the desired pore sizes of the metal sheet, the smaller particles providing a product with a greatly smaller pore size. Also, non-sinterable powders can be admixed with the sinterable matal powders. The sintered powder then provides a matrix which supports the non-sinterable material. Usually, non-sinterable materials include carbon powder, and Rainey nickel powder.

*Trademark of Cabot Corporation
**Trademark of Driver-Harris Corporation

The sheet reinforced material can be selected from the group consisting of metals, expanded metals and their alloys. Examples of backing sheets include copper, stainless steel, nickel base alloys, iron base alloys, cobalt base alloys, Inconel 600*, nichrome alloys, Hastelloy X, Haynes 25, Haynes 188, DH 242, and the like. The thickness of the reinforced metal sheet can vary depending on the end use application of the porous metal structure. However, the thickness should be sufficient so that the metal sheet will be essentially stable in its operating mode and not substantially weakened because of oxidation or the like. A thickness of at least 0.001 inch is recommended and although the thickness may be increased to insure stability in a specific operating environment, minimum thicknesses are desired to minimize the energy needed to abrade the structure. If the reinforced sheet is to function as the back-up sheet, then its thickness will be substantially greater. When the reinforced sheet is to be welded, brazed or otherwise bonded to a back-up structure, then the material of the sheet has to be compatible with the back-up structure and also with the porous metal material selected. The characteristic of the reinforced sheet has to be such that it will not nelt or alloy with the particles of the metal powders during the sintering operation and be relatively stable in its intended operating environment.

*Trademark of the International Nickel Company

The projected segments formed from the reinforced sheet surface can be of any geometric design as long as it fulfills its intended function, that being, to reinforce the porous metal material so as to substantially eliminate spalling, tearing, and delamination of the porous metal when it is subject to either an abradable seal application usage or a thermal cycle environment. The term projected segment is intended to be broad enough to include the projected ridges of a corrugated sheet so that the rows of ridges formed in a sheet will comprise the projected segments of said sheet and therefore be within the scope of this invention.

A primary advantage of having a segment projected sheet reinforced porous metal structure is that when such structure is employed in an abradable seal application, the abrading member upon contacting and rubbing into the porous metal material will contact isolated and non-interacting projected segments which provide support to the porous metal material. Depending on the angle at which the segments are disposed on the reinforcing sheet, the force of the abrading member may tend to bend or fold each segment along its bonding line of intersection formed by the projection and the undeformed surface of the sheet adjacent to the projection. Thus, each projected segment will function independently without transferring the force of the abrading member to other points in the structure. As a result of this independent functioning of the segments, spalling, tearing, and delamination of the porous metal structure is greatly reduced and wear on the abrading member is minimized. The projected ridges of a corrugated type reinforcing sheet in a porous metal structure will also function independently and thus provide the same advantages obtained through the use of smaller-shaped projections formed from the sheet. Again, the abrading member upon contacting and rubbing into the porous metal material will contact the ridges of the corrugated reinforcing sheet and deform or cut through the individual ridges with a minimum of applied force. The force imparted by the abrading member may sometimes tend to fold or bend the ridges along their bounding line of intersection formed by the projected ridges and the undeformed surface of the sheet adjacent the projected ridges. When employing a corrugated type reinforcing sheet, it is preferable to have such sheet initially fabricated as a screen or mesh type structure so that the individual projected ridges will be cut or deformed by a smaller force than the force that would be required if the corrugated sheet was fabricated from a solid sheet.

The density, size, and shape of the projected segments on a reinforced sheet can vary substantially depending on the severity of the thermal cycles to be encountered by the specific porous metal structure. For abradable seal applications, bearings and bearing retainer applications, and brake lining applications, the area of the sheet projected segments projected on a plane parallel to the reinforcing sheet should be at least 5 percent of the area of the reinforced sheet so as to essentially provide the necessary internal support for the porous metal material and thereby substantially eliminate gross spalling, tearing, and delamination of the porous material in its operating mode. For applications wherein a reinforced porous metal structure is to be exposed to thermal cycling environments, then the area of the sheet projected segments projected on a plane parallel with the reinforcing sheet should likewise be at least 5 percent of the area of the reinforced sheet so as to provide the necessary support to prevent delamination of the porous metal material from the sheet in its operating mode. The projected area of the sheet projected segments onto a plane parallel with the reinforcing sheet, as specified above, also includes the projected area of any opening or aperture in the reinforcing sheet made by the projections.

A method for fabricating segment-projected sheet reinforced porous metal structures would entail the initial preparation of a reinforcing sheet with projected segments. The projected segments can be imparted to the reinforcing sheet by any conventional technique such as by stamping, punching, and the like.

Figure 3A:
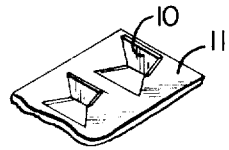
FIG. 3A An isometric sectional view of a projected reinforcing sheet having trapizoidal shaped projections.
Figure 3B:
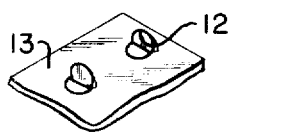
FIG. 3B An isometric sectional view of a segment projected reinforcing sheet having semi-circular shaped projections.
Figure 3C:
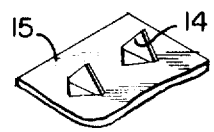
FIG. 3C An isometric sectional view of a segment projected reinforcing sheet having triangular shaped configurations.
Figure 3D:
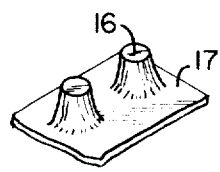
FIG. 3D An isometric sectional view of a segment projected reinforcing sheet having truncated conical projections.
Figure 3E:
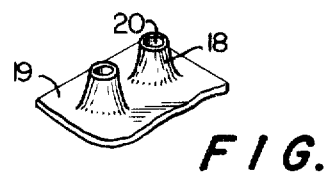
FIG. 3E An isometric sectional view of a segment projected reinforcing sheet having truncated conical projections with openings at the apex.
Figure 3F:
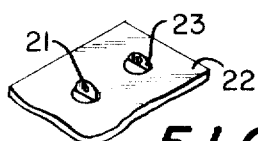
FIG. 3F An isometric sectional view of a segment projected reinforcing sheet having semi-circular shaped segments with openings therein.

The exact configuration of unidirectional projected segments can vary as shown in the drawings. For example, FIG. 3A shows a reinforced sheet 11 having trapizoidal projected segments 10; FIG. 3B shows a reinforcing sheet 13 having semi-circular projected segments 12; FIG. 3C shows a reinforcing sheet 15 having triangular projected segments 14; FIG. 3D shows a reinforcing sheet 17 having truncated conical projected segments 16; FIG. 3E shows a reinforcing sheet 19 having truncated conical projected segments 18 with openings 20 at their apex; and FIG. 3F shows a reinforcing sheet 22 having semi-circular projected segments 23 with apertures 21 therein.

Figure 1:
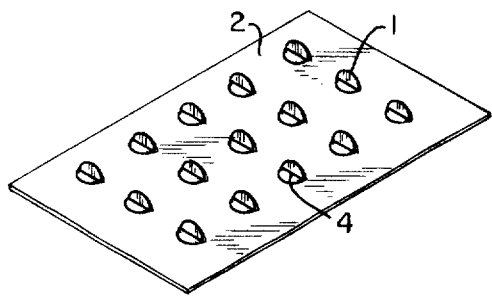
FIG. 1 An isometric view of a segment projected reinforcing sheet.
Figure 2:
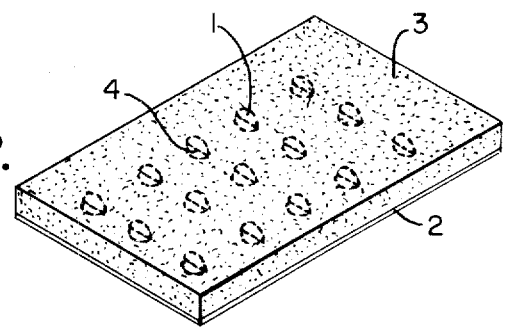
FIG. 2 The segment projected reinforcing sheet of FIG. 1 secured to a porous metal material.

Particles of a metal powder can be deposited by any conventional technique onto said segment projected reinforcing sheet to a height sufficient to cover the projections. Thereafter, the powder deposited reinforcing sheet can be heated to a temperature to sinter the particles of the metal powder so as to produce a porous metal structure. The sintering temperature of the various metal powders is well-known in the art and can be determined by any artisan familiar with powder metallurgy concepts. As shown in FIGS. 1 and 2, a reinforcing sheet 2 having semi-circular projected segments 1 is secured to porous metal material 3. Segments 1 are securely imbedded in the porous metal material 3 thereby providing internal strength to the porous metal material 3. When used as an abradable seal, the porous metal structure of FIG. 2 will have minimum spalling, tearing, and delamination failures, since the individual projected segments will reinforce and better secure porous metal material 3 to backing sheet 1. During the operational mode of the porous metal structure, the abrading member, such as the tip of a turbine blade, may rub into the porous metal material 3 and upon contacting segments 1 therein, the abrading member will either cut through or bend the projected segments 1 along the bounding line 4. Preferably, projected segments 1 are disposed at an angle and positioned in relationship with the abrading member so that a minimum force of the abrading member will tend to bend the projected segments back into the plane of the reinforced sheet and thereby substantially eliminating undesirable cuts and dents being imparted to the abrading member. Consequently, the projected segments should be disposed at an angle with the surface of the reinforcing sheet between about 45° and about 90°, and preferably about 60°.

The number of projected segments necessary to secure adequate reinforcement for the porous metal material is variable and depends on the end use application of the porous metal structure as described above. In addition, for specific applications, it may be desirable to have the projected segments disposed at various angles on the same reinforcing sheet. The backing sheet 2 of FIGS. 1 and 2 may be secured to a back-up structure prior to or subsequent to the sintering of the porous metal powders on sheet 2. The back-up sheet is usually the structural element of an overall assembly wherein said porous metal structure is to be used.

Figure 4B:
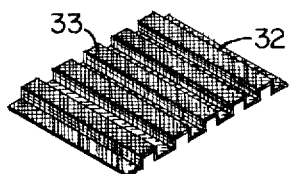
FIG. 4B The mesh type backing sheet of FIG. 4A fabricated into a corrugated configuration.
Figure 4A:
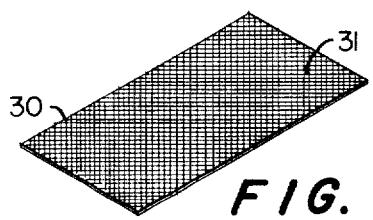
FIG. 4A An isometric view of a mesh type backing sheet.
Figure 4C:
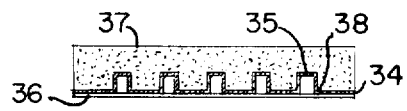
FIG. 4C Corrugated configuration of FIG. 4B imbedded and secured to a porous metal material.

The reinforcing sheet of this invention could also be fabricated from a mesh or screen type sheet 30 having apertures 31 as shown in FIG. 4A. The mesh screen can be fabricated into a corrugated structure having projected ridges 33 protruding from the surface of the sheet 32 as shown in FIG. 4B. Again, particles of a porous metal powder can be appropriately deposited on a corrugated sheet and sintered thereafter. As shown in FIG. 4C, corrugated sheet 34, having ridges 35, is secured to porous metal material 37. This porous metal structure 34–37, is usually secured to a back-up sheet 36 by conventional techniques such as brazing, welding, soldering, or the like. If this porous metal reinforced structure is to be employed as an abradable seal, then the abrading member upon being rubbed into the porous metal material will upon contacting the ridges 35, cut said ridges 35 or force them to bend along the bounding line of intersection 38. Again, the projected ridges may be disposed at an angle with respect to the surface of the sheet as described above. The added internal support provided by this structure will greatly decrease spalling, tearing, and delamination of the porous metal material from the backing sheet and prevent wear of the abrading member. A preferred method of producing a screen or mesh type sheet is to impart cuts, slices, or the like into a solid metal sheet and thereafter expand said sheet so as to produce a screen like structure. This screen like structure can then be fabricated into a corrugated configuration as recited above and shown in FIG. 4B.

Again, the number of ridges on the reinforcing sheet is variable depending upon the end use application of the porous metal structure and should be as specified above.

As recited above, it is also within the scope of this invention that the reinforcing sheet could comprise the back-up member of the porous metal structure as long as the necessary projections are imparted to said back-up member. Thus, the metal powders could be directly applied to a back-up member having projected segments thereon and then the assembly could be appropriately sintered to produce a reinforced porous metal structure ready for use.

The following examples will illustrate embodiments of this invention and are not intended to limit the scope of this invention in any way.

EXAMPLE 1

Three sheets of Inconel 600 alloy* material measuring 1½ inches wide, 6 inches long, and 0.008 inch thick were die punched to form projections from the surface of each sheet. Five rows of projections, with 30 projections per row, were punched onto each sheet thereby imparting a density of about 17 projections per square inch per sheet. The individual projected segments were essentially semi-circular segments measuring one-eighth inch in diameter, disposed at an angle of 60° as made with the reinforcing sheet and projecting up a height of approximately 0.06 inch from the surface of the reinforcing sheet in a manner similar to that shown in FIG. 1. To fabricate this semi-circular projected segment, the segments were cut 210° instead of 180°. Each sheet was then secured to an Inconel 600 alloy back-up shoe by resistance welding. The back-up shoe measured 2 inches by 6 inches by 0.06 inch thick and was performed to a 7 inch diameter. Particles of a porous metal abradable material were then applied to the back-up shoe assembly by the same techniques outlined in copending U.S. Pat. application Ser. No. 128,182. A carefully screened nichrome powder (nominal 80 percent nickel—20 percent chrome) sized between 150 Tyler mesh and 250 Tyler mesh, was applied to the back-up shoe assembly until a total thickness of approximately 0.2 inch was obtained. At this point, the surface of the powder deposited layer was not smooth since the build-up of the powder layer was higher on the areas directly over the projected segments. In addition, the area directly under the projected segments were not appreciably filled with the metal powder material. This was done intentionally so that when an abrading member contacted said projected segments, the resistance-to-deformation force of the projected segments would be reduced or minimized. The powder deposited back-up shoe assembly was then passed through a continuous-belt furnace in a hydrogen atmosphere heated to a temperature of 1,125°C. so as to sinter the particles of the metal powder. The resident time of the assembly at 1,125°C. in the furnace was approximately two hours. The powder particles after this operation were well-sintered to each other and to the supported structure.

*Trademark of the International Nickel Company

A second group of three sheets of Inconel 600 alloy material was treated in the exact same manner as above except that additional projected segments were imparted to the sheet by increasing the number of rows to 7 and the number of projections per row to 40 thereby imparting a density of about 31 projections per square inch on each sheet.

A third group of three sheets of Inconel 600 alloy material was treated in the exact same manner except that the number of rows were increased to 9 and the number of projections per row to 50 so as to produce a density of about 50 projections per square inch on each sheet.

A fourth group of porous metal deposited back-up shoes were produced without the use of reinforcing sheet but was sintered in the same manner as specified above. Hereafter, these back-up shoes will be referred to as control samples.

All of the samples were then surface machined so as to produce a substantially uniform porous layer on the back-up shoe measuring 0.14 inch ± 0.02 inch thick. An abradable test wheel, measuring 7½ inches in diameter and containing a knife edge measuring 0.01 inch flat by 20° included angle, rotated at a speed of 100 feet per second and designed to plunge at a rate of 0.001 inch per second, was used to impart a scar into each of the samples. The horsepower required to impart a scar into the abradable seal material of the unsupported porous back-up shoe (control samples) measured less than 0.1 horsepower. The 0.1 horsepower force was sufficient to induce a scar substantially through the porous metal material of all the samples. The sheet supported porous metal back-up shoes, however, required a force up to 0.85 horsepower when the knife edge of the wheel contacted the projected segments. An evaluation of the back-up shoes after the abradability test revealed that the projected segments were not cut but were only deformed by being folded along their bounding line of intersection back toward the plane of the surface thereby decreasing the angle at which they projected from the surface of the reinforcing sheet. Thus, there was no transfer of force to adjacent projected segments from the segments actually contacted by the knife edge thereby demonstrating that this type reinforced porous metal structure would be very desirable for abradable seal applications.

The group of samples was thereafter oxidized at 1,600°F. in static air for a period of 500 hours. An examination of the samples after this oxidation test showed that the supported porous metal material back-up shoes were substantially intact with the porous metal material securely adhering to the back-up shoe elements. In the unsupported back-up shoes (control samples), the porous metal material actually separated or delaminated from the back-up shoe elements thereby rendering them useless.

As evidenced by the above test, a sheet reinforced porous metal structure of this invention will substantially eliminate gross spalling, tearing, and delamination of the porous material from a back-up substrate and wear of the abrading member and thereby be admirably suited for use as abradable seals, bearings and bearing retainers, and brake linings.

EXAMPLE 2

Six pieces of Inconel 600 expanded metal (½ inch by 12 inch strips), supplied by Exmet Corporation, Bridgeport, Conn., and designated as 5 Inconel 600 8 4/0 were formed by pleating into reinforcing sheets similar to that shown in FIG. 4B. The pleats or ridges were formed on 0.1 inch centers and to a height of 0.6 inch. The pleated strips were then resistance welded to preformed Inconel 600 shoes as described in Example 1. The pleats separated slightly during the attachment step, such that the base of the pleat had a spacing of 0.02 inch to 0.03 inch. Since the pleated strips were only one-half inch wide, two strips were welded side by side on the test shoe to provide a 1 inch × 6 inch test area. The porous metal was applied, sintered, and machined at the same time and in a manner identical to that used for the test specimens and the control samples of Example 1. Testing of these samples was also done at the same time and in an identical manner to the samples and controls of Example 1; thus, the controls for Example 1 also served as controls for Example 2. The oxidation conditions that caused massive failure of the control samples caused no visible separation on the supported structure and a force of only 0.2 horsepower was required to make an abradability cut 0.07 inch deep (0.03 inch into the support structure). The abradability cuts were made perpendicular to the support pleats thereby illustrating that rubs can be made from either direction if desired.

The merit of this type reinforcing sheet is that the ridges can either expand or collapse due to the perpendicular and tangential forces imparted by an abrading member. Thus, the supported structure will deform under a minimum contacting force while simultaneously providing the necessary internal support for the porous metal material that will substantially eliminate spalling, tearing, and delamination of the porous material.

What is claimed is:

1. A method of producing a reinforced porous metal surfaced structure comprising the steps of:
   a. forming segments of a reinforcing backing sheet so as to cause them to project from the surface of said sheet;
   b. depositing particles of a metal powder onto the surface of said reinforcing backing sheet to a height sufficient to at least cover said projecting segments; and
   c. heating the powder coating in the as-deposited state on the reinforcing backing sheet to a temperature sufficient to sinter the particles of said metal powder so as to produce a reinforced porous metal surfaced structure.

2. A method according to claim 1 wherein, measured on a plane parallel to the surface of the reinforcing backing sheet, the area of the projection on said plane of the surface area of the projecting segments equals at least 5 percent of the surface area of the reinforcing backing sheet measured before forming.

3. The method according to claim 1 wherein the reinforcing backing sheet is at least 0.001 inch thick and is selected from the group consisting of metals, expanded metals, and metal alloys.

4. A method according to claim 2 wherein said projecting segments are disposed at an angle of between 45° and about 90° with the unformed surface of said reinforcing backing sheet.

5. A method according to claim 2 wherein said reinforcing backing sheet is a corrugated mesh sheet and wherein the ridges of said corrugation are the projecting segments, said ridges being at substantially a 90° angle with the anticipated direction of the force to be applied by an abrading member contacting the porous metal surface.

6. A sheet reinforced porous metal surfaced structure comprising a reinforcing backing sheet, at least a portion of the surface of which has been formed into projecting segments which project from the unformed portion said surface, and a porous metal material deposited on said reinforcing backing sheet to a height sufficient to at least cover and imbed said projecting segments, said porous metal material being secured on and to said sheet and said projecting segments so as to provide a reinforced structure having a substantially uniform porous metal surface.

7. A sheet reinforced porous metal surfaced structure according to claim 6 wherein, measured on a plane parallel to the surface of the reinforcing backing sheet, the area of the projection on said plane of the surface area of the projecting segments equals at least 5 percent of the surface area of the reinforcing backing sheet measured before forming.

8. A sheet reinforced porous metal surfaced structure according to claim 7 wherein said reinforced backing sheet is at least 0.001 inch thick and is selected from the group consisting of metals, expanded metals, and metal alloys.

9. A sheet reinforced porous metal surfaced structure according to claim 7 wherein said projecting segments are disposed at an angle of between 45° and about 90° with the unformed surface of said reinforcing backing sheet.

10. A sheet reinforced porous metal surfaced structure according to claim 7 wherein said reinforced backing sheet is a corrugated mesh sheet and wherein the ridges of said corrugation are the projecting segments, said ridges being at substantially a 90° angle with the anticipated direction of the force to be applied by an abrading member contacting the porous metal surface.

* * * * *